US012755027B1

(12) United States Patent
Moullotou et al.

(10) Patent No.: US 12,755,027 B1
(45) Date of Patent: Oct. 6, 2026

(54) AUTOMATED SECURITY DETECTION ASSURANCE SYSTEM WITH RULE-AS-CODE MANAGEMENT AND INTEGRATED POSTURE TESTING

(71) Applicant: American International Group, Inc., New York, NY (US)

(72) Inventors: Panagiotis Moullotou, New York, NY (US); Daniel Casado de Luis, New York, NY (US)

(73) Assignee: AMERICAN INTERNATIONAL GROUP, INC., New York, NY (US)

( * ) Notice: Subject to any disclaimer, the term of this patent is extended or adjusted under 35 U.S.C. 154(b) by 0 days.

(21) Appl. No.: 19/450,380

(22) Filed: Jan. 15, 2026

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS 8,407,798 B1 * 3/2013 Lotem ..................... G06F 21/55 726/21
11,086,988 B1 * 8/2021 Putman .................. G06N 3/094
11,704,431 B2 * 7/2023 Kraus ................. H04L 63/0414 726/26
11,783,062 B2 * 10/2023 Lounsberry ......... G06F 21/6218 726/30
11,829,486 B1 * 11/2023 Lambotte ................. G06N 3/09
11,909,773 B2 * 2/2024 Hutelmyer .......... H04L 63/1433
2008/0091583 A1 * 4/2008 Gorton ................... G06Q 40/04 705/36 R
2017/0346839 A1 * 11/2017 Peppe ................. H04L 63/1433
2019/0095320 A1 * 3/2019 Biswas ............... G06F 11/3457
2021/0037040 A1 * 2/2021 Aleks ...................... H04L 63/20
(Continued)

FOREIGN PATENT DOCUMENTS

CN 105516113 A * 4/2016 ......... H04L 63/0245
CN 113312670 A * 8/2021 ......... G06F 21/6245
(Continued)

*Primary Examiner* — Sher A Khan
(74) *Attorney, Agent, or Firm* — Foley & Lardner LLP

(57) ABSTRACT

The present disclosure provides a computer-implemented system for automated security detection assurance comprising a processor, a memory coupled to the processor, and a rule repository storing a plurality of detection rules in a code format. Each detection rule comprises an injector component defining how to artificially generate security data and a watcher component defining expected detection outcomes. The system includes a watchdog manager component executed by the processor and configured to automatically retrieve the detection rules from the rule repository, execute the injector components to generate simulated security events, monitor a security information and event management (SIEM) system for detection outcomes corresponding to the simulated security events, and compare the monitored detection outcomes with the expected detection outcomes defined in the watcher components. A notification component generates alerts when the monitored detection outcomes deviate from the expected detection outcomes.

20 Claims, 6 Drawing Sheets

(56) References Cited

U.S. PATENT DOCUMENTS

| | | | | |
|---|---|---|---|---|
| 2021/0365549 | A1* | 11/2021 | Putman | G06F 21/577 |
| 2022/0377093 | A1* | 11/2022 | Crabtree | H04L 43/045 |
| 2023/0156032 | A1* | 5/2023 | Andriani | H04L 63/1433<br>726/22 |
| 2024/0291863 | A1* | 8/2024 | Cohen | H04L 63/1491 |
| 2024/0428165 | A1* | 12/2024 | Hammond | G06Q 10/0637 |
| 2025/0030725 | A1* | 1/2025 | Fellows | H04L 63/1433 |
| 2026/0037632 | A1* | 2/2026 | Lewak | G06F 21/566 |
| 2026/0057078 | A1* | 2/2026 | Finke | G06F 21/577 |
| 2026/0080120 | A1* | 3/2026 | Frank | G06F 30/20 |
| 2026/0100856 | A1* | 4/2026 | Fortkort | G06N 3/0455 |

FOREIGN PATENT DOCUMENTS

| | | | | | |
|---|---|---|---|---|---|
| CN | 116431460 | A | * | 7/2023 | G06F 11/3409 |
| CN | 118862129 | A | * | 10/2024 | G06F 18/20 |
| CN | 119167360 | A | * | 12/2024 | G06N 3/08 |
| CN | 119513878 | A | * | 2/2025 | |
| CN | 121508916 | A | * | 2/2026 | G06N 5/022 |
| CN | 121644186 | A | * | 3/2026 | |
| WO | WO-2024145209 | A1 | * | 7/2024 | G06N 3/045 |
| WO | WO-2025179019 | A1 | * | 8/2025 | G06F 21/57 |

* cited by examiner

AUTOMATED SECURITY DETECTION ASSURANCE SYSTEM WITH RULE-AS-CODE MANAGEMENT AND INTEGRATED POSTURE TESTING

BACKGROUND

Modern cybersecurity operations rely heavily on Security Information and Event Management (SIEM) systems and detection rules to identify and respond to security threats across enterprise networks. These systems continuously monitor network traffic, system logs, and security events, applying correlation rules to detect patterns indicative of malicious activity. However, maintaining the effectiveness of these detection capabilities presents ongoing challenges for security teams.

Detection rules and correlation logic within SIEM platforms can become outdated, misconfigured, or broken due to changes in the underlying security tools, data formats, or network infrastructure. When security tools receive updates, modify their output schemas, or experience integration issues, the detection rules that depend on this data can fail silently without alerting security personnel. Additionally, the complex chain of systems involved in security event processing—from initial data collection through correlation analysis to final alert generation—creates multiple points of potential failure that can prevent security incidents from being properly detected and escalated.

Traditional approaches to validating detection capabilities often involve manual testing processes or rely on historical data analysis, which can be time-consuming and fail to identify real-time issues. Security teams typically discover detection failures only after security incidents have already occurred, limiting their ability to respond effectively to threats. The lack of automated, continuous validation of detection rules and the broader security alerting pipeline creates gaps in security coverage that malicious actors can exploit.

SUMMARY

This summary is provided to introduce concepts in a simplified form that are further described below in the detailed description. This summary is not intended to identify key features or essential features of the claimed subject matter, nor is it intended to be used as an aid in determining the scope of the claimed subject matter.

According to one aspect, a computer-implemented system for automated security detection assurance includes a processor, a memory coupled to the processor, a rule repository storing a plurality of detection rules in a code format where each detection rule comprises an injector component defining how to artificially generate security data and a watcher component defining expected detection outcomes, a watchdog manager component executed by the processor and configured to automatically retrieve the detection rules from the rule repository, execute the injector components to generate simulated security events, monitor a security information and event management (SIEM) system for detection outcomes corresponding to the simulated security events, and compare the monitored detection outcomes with the expected detection outcomes defined in the watcher components, and a notification component configured to generate alerts when the monitored detection outcomes deviate from the expected detection outcomes.

According to other aspects, detection rules are stored in YAML (yet another markup language) format within the rule repository. The system further comprises a subordinate component configured to execute on a separate computing device and perform the simulated security events as directed by the watchdog manager component. The subordinate component simulates malicious activities including phishing email generation, suspicious domain access attempts, and unauthorized network connections. The watchdog manager component performs syntax validation on the detection rules before executing the injector components. The syntax validation verifies that each detection rule conforms to a predefined schema and contains required fields for rule execution. The notification component integrates with an issue tracking system to automatically create maintenance tickets when detection rule failures are identified.

According to another aspect, a computer-implemented method for validating security detection capabilities includes storing a plurality of detection rules in a version-controlled repository where each detection rule comprises an injector specification and a watcher specification, automatically executing by a processor the injector specification to generate simulated security data, transmitting the simulated security data through a security detection pipeline comprising a plurality of security tools and a security information and event management (SIEM) system, monitoring by the processor outputs from the security detection pipeline for detection results corresponding to the simulated security data, comparing the detection results with expected outcomes defined in the watcher specification, and generating an alert when the detection results fail to match the expected outcomes.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

This disclosure describes a smart security system that automatically tests whether a company's cybersecurity defenses are working properly. This system continuously creates fake cyber-attacks to check if the company's security tools can detect and respond to real threats. When the system finds that security tools are not catching these test attacks as they should, it automatically executes a corrective action including: alerting the security team, generating security response tickets, and/or disabling compromised components so that problems are addressed before real hackers take advantage of the weakness.

Advantageously, the smart security system described herein ensures that security is maintained in a dynamic threat environment. Continuous and automatic testing of the cybersecurity defense can identify and provide appropriate response when security tool policy changes occur or when product updates (including third party product updates) negatively affect security detection policies. The smart security system can notify and close off vulnerabilities before they are exploited.

Figure 1:
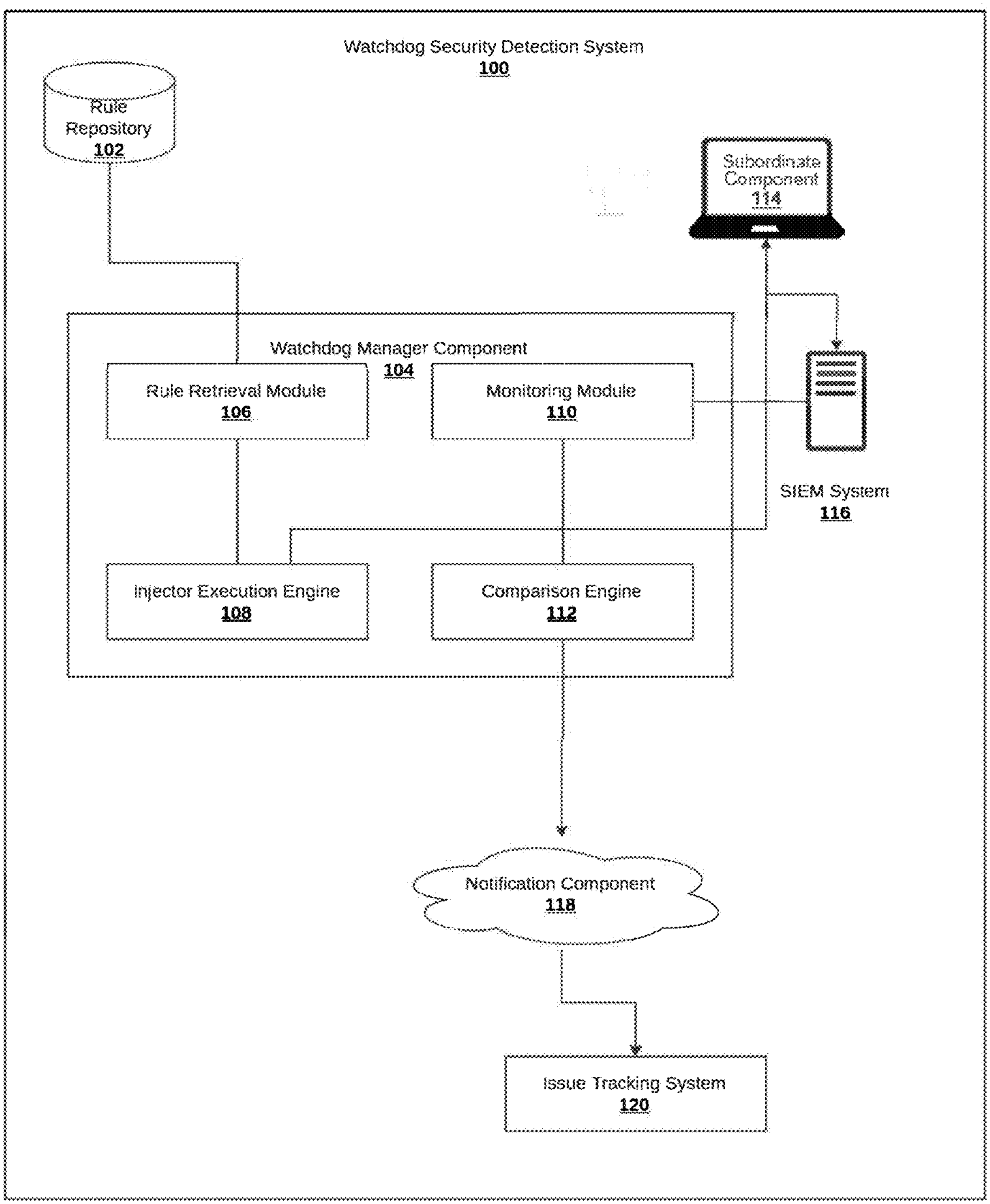
FIG. 1 illustrates a block diagram of a watchdog security detection system, according to aspects of the present disclosure.

Referring to FIG. 1, a watchdog security detection system 100 provides automated validation of security detection capabilities through continuous testing and monitoring. The watchdog security detection system 100 includes a rule repository 102, a watchdog manager component 104, a subordinate component 114, a security information and event management (SIEM) system 116, a notification component 118, and an issue tracking system 120. The watchdog security detection system 100 operates as a computer-implemented system for automated security detection assurance, utilizing a processor and memory coupled to the processor to execute the various components and their associated functions.

The rule repository 102 stores a plurality of detection rules in a code format, with each detection rule comprising an injector component defining how to artificially generate security data and a watcher component defining expected detection outcomes. The detection rules are stored in YAML format within the rule repository 102, providing a structured approach for maintaining security detection logic as code. The rule repository 102 connects to the watchdog manager component 104 to enable automated retrieval and processing of the detection rules.

The watchdog manager component 104 is executed by the processor and includes several sub-components that work together to orchestrate the automated testing process. A rule retrieval module 106 automatically retrieves the detection rules from the rule repository 102 for processing. An injector execution engine 108 receives the retrieved rules from the rule retrieval module 106 and executes the injector components to generate simulated security events. A monitoring module 110 monitors the SIEM system 116 for detection outcomes corresponding to the simulated security events. A comparison engine 112 compares the monitored detection outcomes with the expected detection outcomes defined in the watcher components of the detection rules. As needed, the watchdog manager component 104 retrieves secrets such as tokens, passwords, keys, certificates, credentials, etc. to allow access to necessary systems for notification and/or execution of detection rules. The watchdog manager component 104 retrieves secrets from a centralized secret management system, a distributed system, or may have secrets included in secure configuration files.

With continued reference to FIG. 1, the subordinate component 114 executes on a separate computing device and performs the simulated security events as directed by the watchdog manager component 104. The subordinate component 114 simulates malicious activities including phishing email generation, suspicious domain access attempts, and unauthorized network connections. The subordinate component 114 can be implemented as multiple distributed machines to execute different types of simulated attacks across the network infrastructure, enabling comprehensive testing of various security scenarios.

The SIEM system 116 processes the simulated security data transmitted from the subordinate component 114 through the security detection pipeline. The SIEM system 116 provides detection outcomes to the monitoring module 110, which verifies that the simulated security events produce the expected detection results. The monitoring module 110 verifies data handover between upstream security tools and the SIEM system 116, as well as synchronization between the SIEM system 116 and case management tools.

The notification component 118 generates alerts when the monitored detection outcomes deviate from the expected detection outcomes as determined by the comparison engine 112. The notification component 118 integrates with the issue tracking system 120 to automatically create maintenance tickets when detection rule failures are identified. The issue tracking system 120 receives notifications from the notification component 118 and creates structured maintenance requests for addressing detected failures in the security detection capabilities. The notification component 118 can disable portions of the monitored system when monitored detection outcomes deviate from the expected detection outcomes as determined by the comparison engine 112. For example, based on a priority (e.g., rank, importance, criticality) of the security threat identified.

The notification component 118 can execute several automated actions in response to detected failures. The notification component 118 can generate electronic signals to be transmitted over a communications network. The electronic signals may be configured with encoded data including messages, instructions, etc. that cause another system to generate an alert, generate a notification, or otherwise initiate an automated action. For example, the notification component 118 may generate electronic signals that cause an email to be sent from an email exchange server, a text message to be sent, or a push notification to be displayed on a mobile device indicating the detected failure. In some embodiments, notification component 118 generates control signals for a voice over internet phone system automatically call a responsible person.

Some detected failures may be caused by temporary issues attributed to which of the subordinate components 114 was used to simulate the malicious activity. For example, a subordinate component 114 may be temporarily unavailable (e.g., for system upgrade, reset, etc.). The notification component 118 may be configured to automatically cause the watchdog security detection system 100 to rerun the detection on a different subordinate component 114, for example, a subordinate component 114 in a different geographic location that may not be experiencing similar issues. Similarly, the notification component 118 can schedule a rerun of a failed detection rule at a later time. The notification component 118 can escalate the automated action as a result of continued failures. For example, the notification component 118 may first schedule a rerun in two hours from the failure. If the detection rule fails a second time (e.g., after the two hours), the notification component 118 may escalate the response to sending a notification to security personnel. If the detection rule fails again, the can escalate to supervisory personnel. After repeated failures (e.g., over multiple days) the notification component 118 may be configured to automatically disable the affected system.

The watchdog security detection system 100 operates on a configurable schedule, with daily execution being the current implementation but other cadences being possible depending on organizational requirements. The data flow begins with the rule retrieval module 106 obtaining detection rules from the rule repository 102, followed by the injector execution engine 108 directing the subordinate component 114 to generate simulated security events. The monitoring module 110 observes the resulting detection outcomes from the SIEM system 116, and the comparison engine 112 evaluates whether the outcomes match the expected results defined in the watcher components. When deviations occur, the notification component 118 triggers alerts and coordinates with the issue tracking system 120 to ensure proper remediation tracking.

Figure 2:
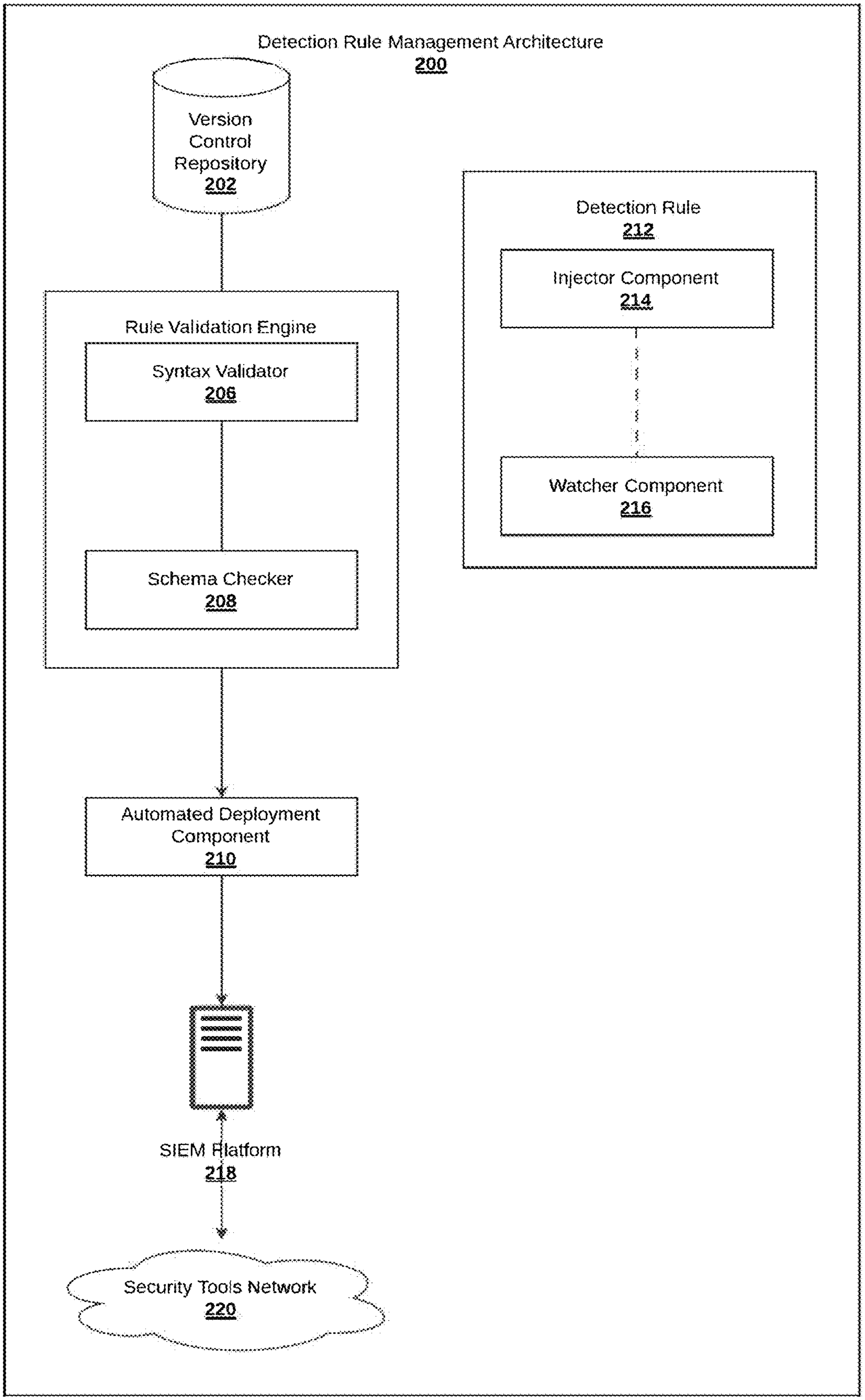
FIG. 2 illustrates a block diagram of a detection rule management architecture for automated security detection assurance, according to aspects of the present disclosure.

Referring to FIG. 2, a detection rule management architecture 200 provides automated security detection assurance through a rule-as-code approach that maintains detection rules in a structured format with comprehensive validation and deployment capabilities. The detection rule management architecture 200 includes a version control repository 202, a rule validation engine 204, an automated deployment component 210, a detection rule 212, a SIEM platform 218, and a security tools network 220.

The version control repository 202 stores detection rules in a code format and provides audit logging for all changes made to the detection rules. The version control repository 202 maintains the detection rules in YAML files, enabling version tracking, collaboration, and change management through standard software development practices. The version control repository 202 connects to the rule validation engine 204 to enable automated validation of detection rules before deployment.

In some implementations, the version control repository 202 is integrated with threat hunting tools and/or systems. Human-driven and/or hypothesis-based threat hunting actions are stored, optimized, and/or converted into detection rules for the version control repository 202. For example, issues (e.g., problems, vulnerabilities, threats, etc.) detected through manual processes in threat hunting tools can trigger the detection rule management architecture 200 to generate a detection rule (e.g., in YAML) implementing the actions that were manually performed to detect the issue. Vendor-based and/or community-based detection rules can also be received and integrated into detection rules for the version control repository 202. Newly created detection rules are integrated within a continuous integration and continuous deployment (CI/CD) pipeline, ensuring that new rules are promptly validated and deployed to the live version control repository 202.

The rule validation engine 204 comprises a syntax validator 206 and a schema checker 208 that work together to validate detection rules before deployment to production systems. The syntax validator 206 verifies the syntactic correctness of the detection rules and performs syntax validation on detection rules before initiating automated testing. The schema checker 208 ensures that each detection rule conforms to a predefined schema and contains required fields for rule execution. The rule validation engine 204 can detect unexpected changes to security data format or schema from source security tools that might break detection rules, providing proactive identification of potential compatibility issues.

With continued reference to FIG. 2, the automated deployment component 210 propagates validated detection rules from the version control repository 202 to the SIEM platform 218 after successful validation by the rule validation engine 204. The automated deployment component 210 eliminates manual copy-and-paste operations that can introduce discrepancies between the rule repository and deployed rules, ensuring consistency across the security detection infrastructure.

A detection rule 212 includes test injection logic and expected result validation logic through an injector component 214 and a watcher component 216 that maintain a paired relationship within each rule definition. The injector component 214 defines how to artificially generate security data for testing purposes and can integrate with open-source testing frameworks like Atomic Red Team to leverage pre-defined attack simulations instead of custom injector logic. The injector component 214 can also integrate with commercial Breach and Attack Simulation (BAS) tools like SafeBreach for enhanced testing capabilities. The watcher component 216 defines the expected detection outcomes and can specify expected log entries from specific security tools rather than just detection alerts, allowing for more granular validation of the security detection pipeline. For example, the security detection pipeline can be tested end-to-end. In simulations (e.g., tests) configured to intentionally cause changes or disruptions to the system, incomplete log evidence can be detected even if the alert is generated. The detection rule 212 can validate an entire chain of expected alerts to ensure that the reacting security team will have information to respond quickly. In addition, testing the response to some simulated events may be impractical because the response is destructive to the system insomuch as it would cause the system to enter a safe mode or a similar restrictive use mode to prevent a threat from propagating, in such scenarios the detection rule 212 can specify events (results, etc.) that should appear in the log, but stop short of validating the full response occurred.

A detection rule 212 may include only a watcher component 216 indicating an expected result. For example, some detection rules 212 may indicate an expected state of operation and not require causing an event with an injector component 214. The watcher component 216 can validate the expected state to ensure no suspicious activity has occurred. In addition, executing a detection rule 212 having a watcher component 216 ensures that necessary telemetry is available from the tested system in the event of an actual threat. Detection rules with only a watch component are useful when injecting the threat would cause the system to enter an undesirable state or could leave the system in a compromised (e.g., vulnerable state) for too long.

A detection rule 212 can include criticality flags and other metadata fields to provide additional context and prioritization information for security operations teams. The detection rule management architecture 200 supports tool testing rules that are simplified versions of detection rules specifically designed to verify the effectiveness of critical security controls without the complexity of full detection rule logic. The criticality flags and/or other metadata can be used by the notification component 118 to generate differentiated response for different criticality flags ensuring that the corrective action is commensurate with the threat. For example, a maintenance ticket is generated for a low criticality rule failure, a maintenance ticket and an alert such as an email, text message, or dashboard indicator is generated for a high criticality rule failure and affected or correlated portions of the monitored system are disabled (e.g., allowing no traffic or requests) for critical rule failures. The notification component 118 escalates rule failures when failures are not addressed. Rule failures are escalated by moving to a higher criticality level and/or providing alerts to additional security team members.

The SIEM platform 218 connects bidirectionally with the security tools network 220, enabling the exchange of security data and detection results throughout the security infrastructure. The security tools network 220 represents the collection of security monitoring tools that feed data into the SIEM platform 218 for analysis and correlation. The SIEM platform 218 receives the propagated detection rules from the automated deployment component 210 and processes security events according to the deployed rule logic.

The detection rule management architecture 200 operates as a rule management component that maintains detection rules as code in a structured format, supporting both system and method implementations for automated security detection validation. The architecture provides a manager controller function that orchestrates automated testing of security detection rules through the coordinated operation of the validation and deployment components.

Figure 3:
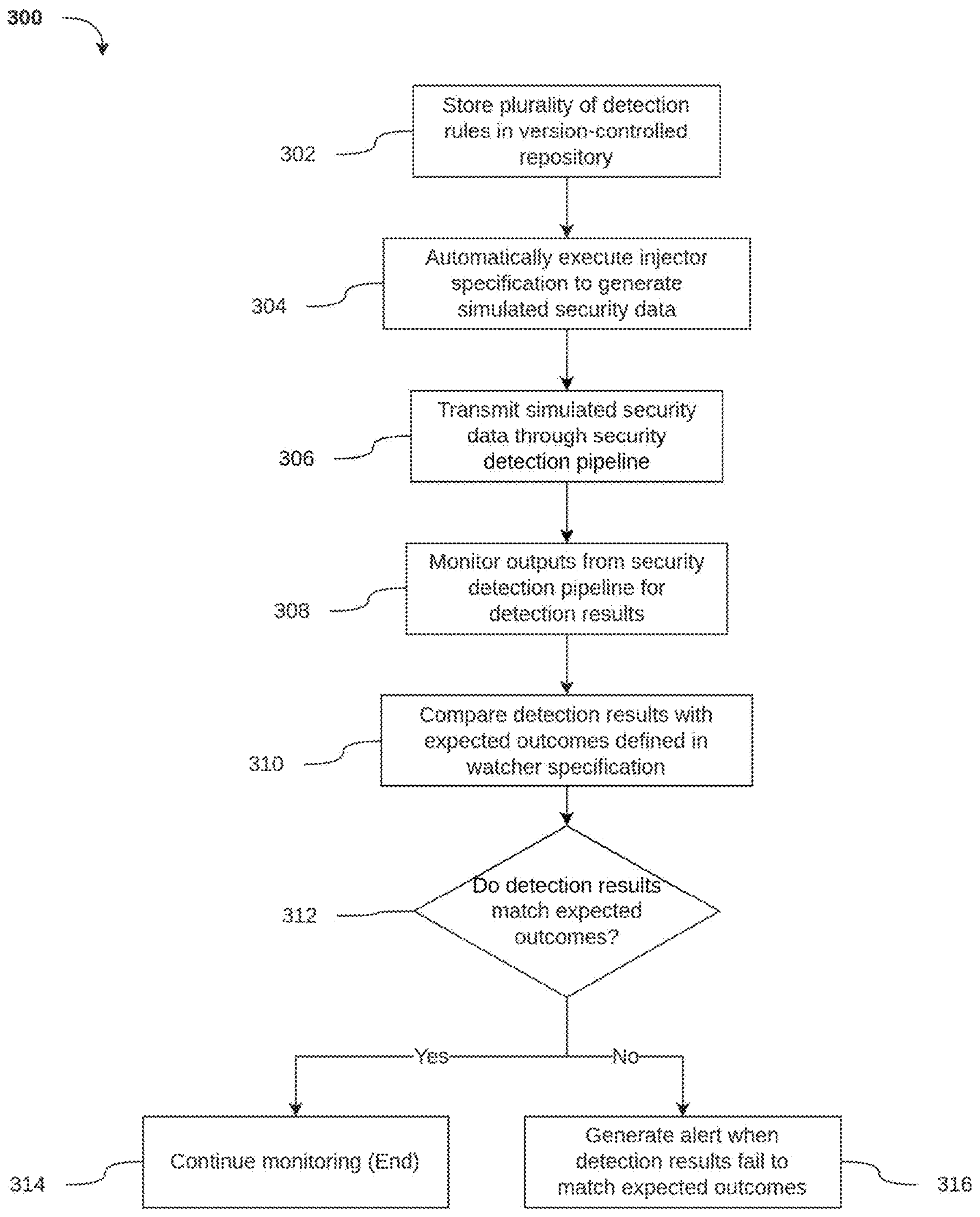
FIG. 3 illustrates a flowchart for a computer-implemented method for validating security detection capabilities, according to aspects of the present disclosure.

Referring to FIG. 3, a computer-implemented method 300 for validating security detection capabilities provides a systematic approach for ensuring proper functionality of security detection systems through automated testing and validation processes. The method 300 begins with step 302, where a plurality of detection rules are stored in a version-controlled repository. Each detection rule comprises an injector specification and a watcher specification that define the testing parameters and expected outcomes for validation processes. The detection rules are stored in YAML format within the version-controlled repository, providing structured data representation that enables automated processing and version control capabilities.

The method 300 proceeds to step 304, which involves automatically executing, by a processor, the injector specification to generate simulated security data. The injector specification defines the specific parameters and procedures for creating artificial security events that mimic real-world threats and malicious activities. Step 304 enables the generation of controlled test scenarios that can be consistently reproduced for validation purposes.

Following the generation of simulated security data, the method 300 continues to step 306, where the simulated security data is transmitted through a security detection pipeline comprising a plurality of security tools and a security information and event management (SIEM) system. Step 306 ensures that the simulated security data flows through the complete detection infrastructure, including all intermediate security tools and processing components that would normally handle legitimate security events. The watchdog security detection system can identify integration issues between source security tools and the SIEM system that prevent proper data flow during this transmission phase.

The method 300 advances to step 308, where outputs from the security detection pipeline are monitored, by the processor, for detection results corresponding to the simulated security data. Step 308 involves continuous observation of the security detection pipeline to capture all relevant detection outcomes and processing results generated in response to the simulated security events. The monitoring process tracks the progression of simulated security data through each component of the detection pipeline.

With continued reference to FIG. 3, the method 300 proceeds to step 310, where the detection results are compared with expected outcomes defined in the watcher specification. Step 310 performs a detailed analysis of the actual detection results against the predetermined expectations established in the watcher specification component of each detection rule. The comparison process evaluates whether the security detection pipeline produced the anticipated alerts, logs, and other detection artifacts.

The method 300 includes a decision point at step 312, which determines whether the detection results match the expected outcomes. Step 312 presents a branching logic that directs the subsequent flow of the method 300 based on the comparison results from step 310. The decision criteria evaluate the alignment between actual and expected detection outcomes to determine the appropriate response path.

If the detection results match the expected outcomes, the method 300 follows the "Yes" branch to step 314, where monitoring continues and the validation process concludes successfully. Step 314 indicates that the security detection capabilities are functioning properly and no corrective action is required for the tested detection rules.

If the detection results fail to match the expected outcomes, the method 300 follows the "No" branch to step 316, where an alert is generated when the detection results fail to match the expected outcomes. Step 316 triggers notification processes to inform security operations teams of the validation failure or other corrective actions. Generating the alert comprises automatically creating a maintenance ticket in an issue tracking system when the detection results fail to match the expected outcomes, ensuring that detected issues are properly tracked and addressed through established maintenance workflows.

The method 300 includes performing syntax validation on each detection rule before executing the injector specification, providing an additional layer of quality assurance. The syntax validation includes verifying that each detection rule conforms to a predefined schema and contains required fields for rule execution, preventing execution errors and ensuring consistent rule structure across the validation system.

Figure 4:
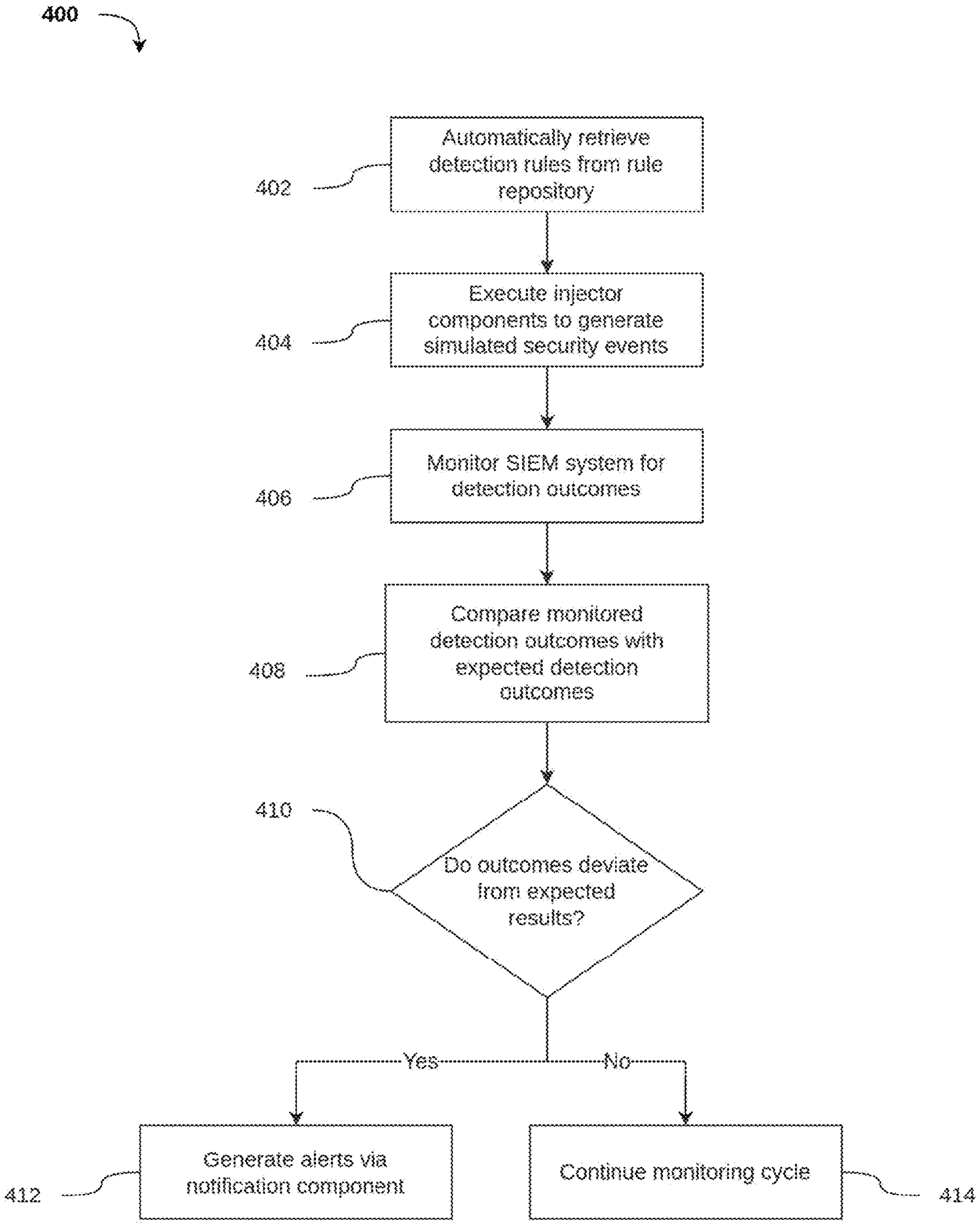
FIG. 4 illustrates a flowchart for an automated security detection assurance method, according to aspects of the present disclosure.

Referring to FIG. 4, an automated security detection assurance method 400 provides systematic continuous validation through automated testing and comparison of actual versus expected detection outcomes. The method 400 operates through a sequential flow that ensures comprehensive monitoring and validation of security detection capabilities across the entire detection infrastructure. For example, the method 400 can determine whether the security detection pipeline produced the anticipated alerts, logs, and other detection artifacts. The method 400 can generate alerts or perform other automated actions in response to determining that the security detection capabilities did not perform as expected.

The method 400 begins with a step 402, where detection rules are automatically retrieved from a rule repository. Step 402 establishes the foundation for the validation process by obtaining the detection rules that define both the testing parameters and expected outcomes for each security detection scenario. The automatic retrieval eliminates manual intervention and ensures consistent access to the most current detection rule definitions stored in the rule repository.

The method 400 proceeds to a step 404, which involves executing injector components to generate simulated security events. Step 404 implements the testing logic defined within each detection rule by activating the injector components that create artificial security data designed to trigger the detection pipeline. Executing the injector specification comprises directing a remote subordinate component to perform simulated malicious activities on a separate computing device, enabling distributed testing across network infrastructure. The simulated malicious activities include phishing email generation, suspicious domain access attempts, and unauthorized network connections, providing comprehensive coverage of common threat vectors that security detection systems must identify and respond to appropriately.

Following the generation of simulated security events, the method 400 moves to a step 406, where the SIEM system is monitored for detection outcomes corresponding to the simulated security events. Step 406 establishes continuous observation of the SIEM system to capture all detection results and processing outcomes generated in response to the simulated security events. The monitoring process tracks the complete flow of simulated security data through the detection pipeline and identifies any gaps or failures in the detection process. The watchdog security detection system can monitor for security data gaps and temporal outages in security tools that feed into the SIEM system, providing comprehensive visibility into the health and functionality of the entire security detection infrastructure.

The method 400 continues to a step 408, where the monitored detection outcomes are compared with expected detection outcomes defined in the detection rules. Step 408 performs detailed analysis of the actual detection results against the predetermined expectations established in the watcher components of each detection rule. The comparison process evaluates whether the security detection pipeline produced the anticipated alerts, logs, and other detection artifacts as specified in the detection rule definitions.

With continued reference to FIG. 4, the method 400 reaches a decision point at a step 410, which determines whether the outcomes deviate from the expected results. Step 410 presents branching logic that directs the subsequent flow of the method 400 based on the comparison results from step 408. The decision criteria evaluate the alignment between actual and expected detection outcomes to determine the appropriate response path for maintaining security detection assurance.

If the outcomes deviate from expected results, the method 400 follows the "Yes" branch to a step 412, where alerts are generated via the notification component or other corrective actions are performed (e.g., based on the criticality of the detection rule). Step 412 triggers notification processes to inform security operations teams of validation failures and ensures that detected issues receive appropriate attention. The alert generation process creates structured notifications that provide detailed information about the specific detection rule failures and their potential impact on security monitoring capabilities.

If the outcomes do not deviate from expected results, the method 400 follows the "No" branch to a step 414, where the monitoring cycle continues. Step 414 indicates that the security detection capabilities are functioning properly and the automated validation process can proceed with ongoing monitoring activities. The continuous monitoring cycle ensures that security detection systems maintain their effectiveness over time and can identify any degradation in detection capabilities as soon as deviations occur.

The method 400 provides systematic continuous validation by implementing automated testing cycles that run on configurable schedules, enabling organizations to maintain confidence in their security detection capabilities without manual intervention. The automated comparison of actual versus expected detection outcomes ensures that any failures or degradations in security detection systems are identified promptly and addressed through established maintenance workflows.

Figure 5:
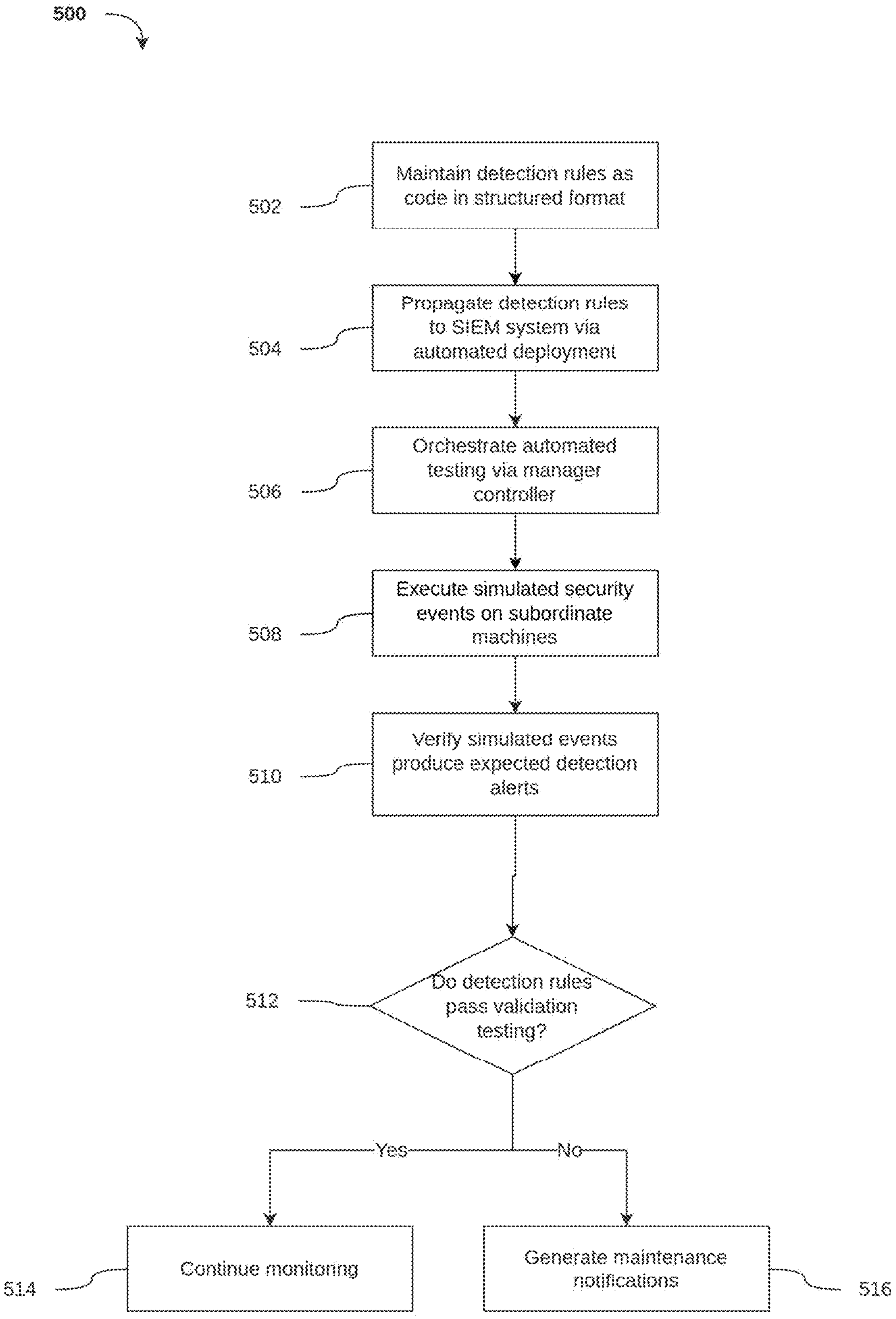
FIG. 5 illustrates a flowchart for a security detection validation method, according to aspects of the present disclosure.

Referring to FIG. 5, a security detection validation method 500 provides comprehensive validation of security detection capabilities through a structured approach that maintains detection rules as code and orchestrates automated testing cycles. The method 500 implements a sequential validation flow with decision-making criteria for determining detection rule functionality and appropriate response actions based on validation outcomes.

The method 500 begins with a step 502, where detection rules are maintained as code in a structured format. Step 502 establishes the foundation for the validation system by storing detection rules in YAML files within a version-controlled repository, enabling software development practices such as version tracking, collaboration, and change management. The structured format includes test injection logic and expected result validation logic within each detection rule definition, providing comprehensive specifications for both testing procedures and validation criteria.

The method 500 proceeds to a step 504, which involves propagating detection rules to a SIEM system via automated deployment. Step 504 eliminates manual deployment processes that can introduce discrepancies between the rule repository and production systems. The automated deployment component ensures that validated detection rules are consistently deployed to the SIEM system without human intervention, maintaining synchronization between the code repository and the operational security detection infrastructure.

Following the deployment of detection rules, the method 500 continues to a step 506, where automated testing is orchestrated via a manager controller. Step 506 coordinates the execution of validation tests across multiple components of the security detection system. The manager controller function manages the scheduling and execution of testing cycles, directing various system components to perform their designated roles in the validation process. The orchestration includes coordination between subordinate machines, monitoring systems, and validation engines to ensure comprehensive testing coverage.

The method 500 advances to a step 508, where simulated security events are executed on subordinate machines. Step 508 implements the injector logic defined within the detection rules by directing subordinate machines to perform specific simulated malicious activities. The subordinate machines operate as separate computing devices that execute controlled security events designed to trigger the detection pipeline. The simulated security events can include various threat scenarios such as network intrusion attempts, malware execution, and data exfiltration activities that test different aspects of the security detection capabilities.

With continued reference to FIG. 5, the method 500 proceeds to a step 510, where the system verifies that simulated events produce expected detection alerts. Step 510 monitors the SIEM system and associated security tools to confirm that the simulated security events generate the anticipated detection outcomes as specified in the watcher components of the detection rules. The verification process compares actual detection results with expected outcomes to determine whether the security detection pipeline is functioning according to specifications.

The method 500 reaches a decision point at a step 512, which presents a determination of whether detection rules pass validation testing. Step 512 evaluates the results from step 510 to determine the appropriate response path based on validation outcomes. The decision criteria assess whether the actual detection results align with the expected outcomes defined in the detection rule specifications, providing branching logic that directs subsequent actions.

If the detection rules pass validation testing, the method 500 follows the "Yes" branch to a step 514, where monitoring continues. Step 514 indicates that the security detection capabilities are functioning properly and the validation cycle can proceed with ongoing monitoring activities. The continuous monitoring ensures that security detection systems maintain their effectiveness and can identify any future degradation in detection capabilities.

If the detection rules fail validation testing, the method 500 follows the "No" branch to a step 516, where maintenance notifications are generated. Step 516 triggers notification processes that inform security operations teams of validation failures and create structured maintenance requests for addressing detected issues. The maintenance notifications include detailed information about the specific detection rule failures and their potential impact on security monitoring capabilities, enabling prompt remediation through established maintenance workflows. Step 516 can also include automatically disabling systems or portions thereof until remediation occurs, for example, to ensure that critical vulnerabilities are addressed upon detection.

The method 500 provides systematic validation through automated testing cycles that can be configured to run on various schedules, with nightly execution being a common implementation. The sequential validation flow ensures that detection rules are properly maintained, deployed, tested, and monitored throughout their lifecycle, while the decision-making criteria enable appropriate responses to both successful validations and detected failures in the security detection infrastructure.

Figure 6:
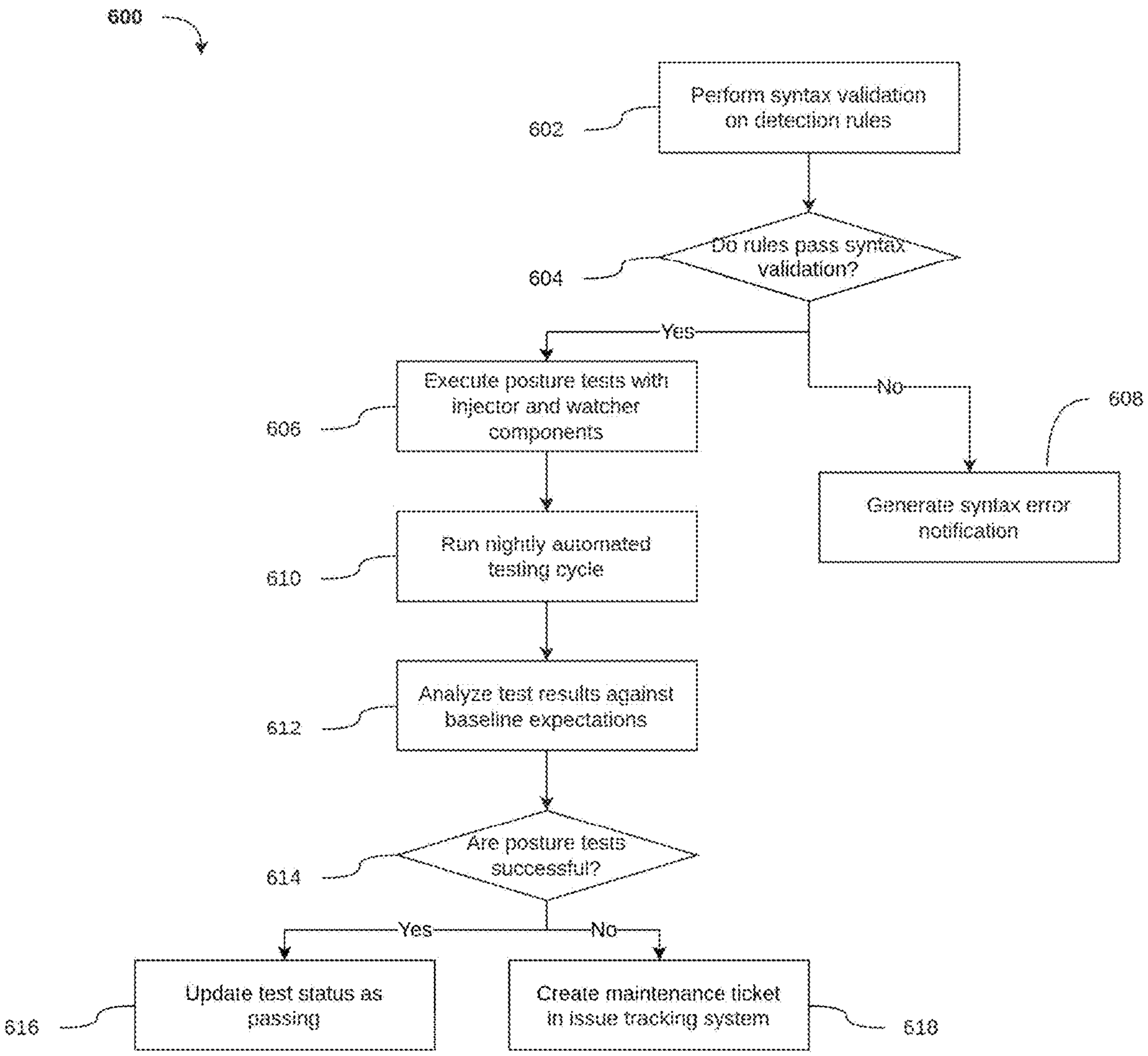
FIG. 6 illustrates a flowchart for an automated security detection assurance method with syntax validation, according to aspects of the present disclosure.

Referring to FIG. 6, an automated security detection assurance method 600 provides comprehensive validation of security detection capabilities through syntax validation and nightly testing cycles that maintain security detection rule integrity through continuous validation and monitoring. The method 600 incorporates automated error handling through notification generation and ticket creation, ensuring systematic maintenance of the security detection infrastructure.

The method 600 begins with a step 602, where syntax validation is performed on detection rules. Step 602 establishes the foundation for rule validation by verifying the structural correctness and format compliance of detection rules before proceeding with functional testing. The syntax validation process examines each detection rule to ensure proper formatting, correct field definitions, and adherence to the established rule schema requirements.

The method 600 proceeds to a step 604, which involves a decision point to determine if the rules pass syntax validation. Step 604 evaluates the results from the syntax validation performed in step 602 and provides branching logic that directs the subsequent flow based on validation outcomes. The decision criteria assess whether the detection rules meet the syntactic requirements for proper execution within the security detection system.

If the rules pass validation, the method 600 follows the "Yes" branch to a step 606, where posture tests are executed with injector and watcher components. Step 606 implements the functional testing phase by activating the injector components that generate simulated security events and the watcher components that define expected detection outcomes. The posture tests verify the operational effectiveness of detection rules by executing controlled security scenarios and monitoring the resulting detection pipeline responses.

If the rules fail validation, the method 600 follows the "No" branch to a step 608, where a syntax error notification is generated. Step 608 triggers notification processes that inform security operations teams of syntax validation failures, providing detailed information about the specific syntax errors that prevent proper rule execution. The syntax error notifications enable prompt correction of rule formatting issues before the rules are deployed to production systems.

Following successful syntax validation, the method 600 continues to a step 610, where a nightly automated testing cycle is run. Step 610 implements scheduled execution of the validation tests on a recurring basis, ensuring continuous monitoring of security detection capabilities. The nightly automated testing cycle provides regular assessment of detection rule functionality without manual intervention, maintaining ongoing assurance of security detection system effectiveness.

The method 600 advances to a step 612, where test results are analyzed against baseline expectations. Step 612 performs detailed comparison of the actual test outcomes with the predetermined expectations established in the detection rule specifications. The analysis process evaluates whether the security detection pipeline produced the anticipated results and identifies any deviations from expected behavior that might indicate system degradation or configuration issues.

With continued reference to FIG. 6, the method 600 proceeds to a step 614, which presents a decision point to determine if the posture tests are successful. Step 614 evaluates the analysis results from step 612 and provides branching logic that directs appropriate response actions based on test outcomes. The decision criteria assess whether the actual detection results align with the expected outcomes defined in the watcher components of the detection rules.

If the posture tests are successful, the method 600 follows the "Yes" branch to a step 616, where the test status is updated as passing. Step 616 records the successful validation outcome and maintains status tracking for the tested detection rules. The status update provides visibility into the health and functionality of individual detection rules within the security detection system.

If the posture tests fail, the method 600 follows the "No" branch to a step 618, where a maintenance ticket is created in an issue tracking system. Step 618 automatically generates structured maintenance requests that provide detailed information about the specific detection rule failures and their potential impact on security monitoring capabilities. The maintenance ticket creation ensures that detected issues are properly tracked and addressed through established maintenance workflows.

The method 600 includes a step 620 that completes the validation cycle and prepares for subsequent testing iterations. Step 620 finalizes the current testing cycle and establishes the foundation for ongoing continuous validation monitoring. The completion of each validation cycle enables the method 600 to maintain systematic assessment of security detection rule integrity over time.

The notification component within the method 600 provides executive-level visualizations showing security tool health status overlaid on graphical representations like fortress diagrams. These visualizations present security tool status information in an intuitive format that enables executive stakeholders to quickly assess the overall health and effectiveness of the security detection infrastructure. The fortress diagram representation overlays status indicators for various security tools onto a graphical fortress structure, providing a comprehensive view of the security posture and detection capabilities across the organization.

The method 600 provides systematic maintenance of security detection rule integrity through the combination of syntax validation, functional testing, automated error handling, and continuous monitoring capabilities. The sequential validation flow ensures that detection rules are properly validated before deployment and continuously monitored for effectiveness throughout their operational lifecycle.

A number of implementations have been described. Nevertheless, it will be understood that various modifications may be made without departing from the spirit and scope of the disclosure. Accordingly, other implementations are within the scope of the following claims.

What is claimed is:

1. A computer-implemented system for automated security detection assurance, comprising:

a processor;

a memory coupled to the processor;

a rule repository storing a plurality of detection rules in a code format, each detection rule comprising an injector component defining how to artificially generate security data and a watcher component defining expected detection outcomes;

a watchdog manager component comprising software instructions stored in the memory and executed by the processor, the watchdog manager component configured to:

automatically retrieve the detection rules from the rule repository, execute the injector components to generate simulated security events, monitor a security information and event management (SIEM) system for detection outcomes corresponding to the simulated security events, and compare the monitored detection outcomes with the expected detection outcomes defined in the watcher components; and a notification component comprising software instructions stored in the memory and executed by the processor, the notification component configured to generate alerts when the monitored detection outcomes deviate from the expected detection outcomes.

2. The system of claim 1, further comprising an automated deployment component comprising software instructions stored in the memory and executed by the processor, the automated deployment component configured to propagate the detection rules from the rule repository component to a security information and event management (SIEM) system.

3. The system of claim 1, further comprising a subordinate component comprising software instructions configured to execute on a separate computing device and perform the simulated security events as directed by the watchdog manager component.

4. The system of claim 3, wherein the subordinate component is configured to simulate malicious activities including phishing email generation, suspicious domain access attempts, and unauthorized network connections.

5. The system of claim 1, wherein the watchdog manager component is further configured to perform syntax validation on the detection rules before executing the injector components.

6. The system of claim 5, wherein the syntax validation includes verifying that each detection rule conforms to a predefined schema and contains required fields for rule execution.

7. The system of claim 1, wherein the notification component is configured to integrate with an issue tracking system to automatically create maintenance tickets when detection rule failures are identified.

8. A computer-implemented method for validating security detection capabilities, comprising:

storing a plurality of detection rules in a version-controlled repository, each detection rule comprising an injector specification and a watcher specification;

automatically executing, by a processor, the injector specification to generate simulated security data;

transmitting the simulated security data through a security detection pipeline comprising a plurality of security tools and a security information and event management (SIEM) system;

monitoring, by the processor, outputs from the security detection pipeline for detection results corresponding to the simulated security data;

comparing the detection results with expected outcomes defined in the watcher specification; and generating an alert when the detection results fail to match the expected outcomes.

9. The method of claim 8, further comprising propagating, by the processor, the detection rules from the version-controlled repository to a security information and event management (SIEM) system.

10. The method of claim 8, further comprising a step of performing syntax validation on each detection rule before executing the injector specification.

11. The method of claim 10, wherein the syntax validation includes verifying that each detection rule conforms to a predefined schema and contains required fields for rule execution.

12. The method of claim 8, wherein executing the injector specification comprises directing a remote subordinate component to perform simulated malicious activities on a separate computing device.

13. The method of claim 12, wherein the simulated malicious activities include phishing email generation, suspicious domain access attempts, and unauthorized network connections.

14. The method of claim 8, wherein generating the alert comprises automatically creating a maintenance ticket in an issue tracking system when the detection results fail to match the expected outcomes.

15. A security detection validation system, comprising:

a manager controller comprising a processor and a memory, the manager controller configured to orchestrate automated testing of security detection rules;

a plurality of subordinate machines configured to execute simulated security events under control of the manager controller;

a rule management component comprising software instructions stored in the memory and executed by the processor of the manager controller, the rule management component configured to maintain detection rules as code in a structured format, wherein each detection rule includes test injection logic and expected result validation logic;

an automated deployment component comprising software instructions stored in the memory and executed by the processor of the manager controller, the automated deployment component configured to propagate detection rules from the rule management component to a security information and event management (SIEM) system; and a monitoring component comprising software instructions stored in the memory and executed by the processor of the manager controller, the monitoring component configured to verify that simulated security events generated by the subordinate machines produce expected detection alerts in the SIEM system and generate maintenance notifications when detection rules fail validation testing.

16. The system of claim 15, wherein the structured format comprises YAML files stored in a version-controlled repository.

17. The system of claim 16, wherein the version-controlled repository provides audit logging for all changes made to the detection rules.

18. The system of claim 15, wherein the manager controller is configured to perform syntax validation on detection rules before initiating automated testing.

19. The system of claim 18, wherein the syntax validation includes verifying that each detection rule conforms to a predefined schema and contains required fields for test execution.

20. The system of claim 15, wherein the monitoring component is configured to integrate with an issue tracking system to automatically create maintenance tickets when detection rule validation failures are identified.

* * * * *